United States Patent
Ito et al.

(10) Patent No.: US 9,280,159 B1
(45) Date of Patent: Mar. 8, 2016

(54) SHUTDOWN METHOD BY USING LOCAL CONTROL BOARD

(71) Applicant: Google Inc., Mountain View, CA (US)

(72) Inventors: Nobuyuki Ito, Tokyo (JP); Junichi Urata, Tokyo (JP)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/703,050

(22) Filed: May 4, 2015

Related U.S. Application Data (60) Provisional application No. 62/051,336, filed on Sep. 17, 2014.

(51) Int. Cl.
*G05D 1/00* (2006.01)
*G05D 1/02* (2006.01)

(52) U.S. Cl.
CPC .............. *G05D 1/0225* (2013.01); *Y10S 901/01* (2013.01)

(58) Field of Classification Search
CPC ............................. G05D 1/0225; Y10S 901/01
See application file for complete search history.

(56) References Cited

U.S. PATENT DOCUMENTS

| | | | |
|---|---|---|---|
| 7,053,579 B2 | 5/2006 | Moridaira | |
| 8,073,564 B2 | 12/2011 | Bruemmer et al. | |
| 2007/0005179 A1 | 1/2007 | Mccrackin et al. | |
| 2011/0224828 A1* | 9/2011 | Breznak | B25J 9/08 700/264 |
| 2013/0120547 A1 | 5/2013 | Linnell | |

* cited by examiner

*Primary Examiner* — Mussa A Shaawat
*Assistant Examiner* — Yuen Wong
(74) *Attorney, Agent, or Firm* — McDonnell Boehnen Hulbert & Berghoff LLP (57) ABSTRACT

The present application discloses implementations that involve shutdowns of a robotic system. An example may include controlling, by a robotic system, a plurality of motors of the robotic system with a central processing unit (CPU). The example may also include determining, by the robotic system, an error condition of the robotic system, where the error condition prevents the CPU from controlling at least one of the plurality of motors. The example may also include causing a plurality of motor driver boards to control the plurality of motors of the robotic system in response to determining the error condition of the robotic system. The example may also include receiving, by the plurality of motors, one or more commands from the plurality of motor driver boards to move the robotic system to a stationary position and park the robotic system in the stationary position.

20 Claims, 7 Drawing Sheets

SHUTDOWN METHOD BY USING LOCAL CONTROL BOARD

CROSS-REFERENCE TO RELATED APPLICATION

This application claims the benefit of U.S. Provisional Application No. 62/051,336, filed Sep. 17, 2014.

BACKGROUND

Humanoid robotic systems may have a structure that resembles a human body. An example humanoid robot system may have a robotic head, two robotic arms, a main robotic body, and two robotic legs. Such a robotic system may stand with the two robotic legs. For example, each of the robotic legs may include a robotic knee, a robotic ankle, and a robotic foot. The robotic legs may stabilize the robotic system. For instance, one of the robotic legs may bear the weight of the robotic system while the other leg swings forward to take a step in a given direction.

SUMMARY

The present application discloses implementations that involve shutdowns of a robotic system to protect the robotic device from damage. An example may include controlling, by a robotic system, a plurality of motors of the robotic system with a central processing unit (CPU). The example may also include determining, by the robotic system, an error condition of the robotic system, where the error condition prevents the CPU from controlling at least one of the plurality of motors. The example may also include causing a plurality of motor driver boards to control the plurality of motors of the robotic system in response to determining the error condition of the robotic system. The example may also include receiving, by the plurality of motors, one or more commands from the plurality of motor driver boards. The example may also include causing the robotic system to move to a stationary position and park the robotic system in the stationary position based on the received one or more commands from the plurality of motor driver board.

In another implementation, a non-transitory computer-readable storage medium having stored thereon instructions, that when executed by a CPU, cause a robotic system to carry out operations. The operations may include controlling a plurality of motors of the robotic system with the CPU. The operations may also include determining an error condition of the robotic system, where the error condition prevents the CPU from controlling at least one of the plurality of motors. The operations may also include causing a plurality of motor driver boards to control the plurality of motors of the robotic system in response to determining the error condition of the robotic system. The operations may also include receiving one or more commands from the plurality of motor driver boards. The operations may also include causing the robotic system to move to a stationary position and park the robotic system in the stationary position based on the received one or more commands from the plurality of motor driver boards.

In another implementation, a robotic system is provided. The robotic system may include one or more robotic legs connected to a main body, a CPU, and a plurality of motors including a plurality of motor driver boards. The robotic system may also include data storage including program instructions stored thereon that when executed by one or more processors of the robotic system, cause the robotic system to perform operations. The operations may include controlling a plurality of motors of the robotic system with the CPU. The operations may also include determining an error condition of the robotic system, where the error condition prevents the CPU from controlling at least one of the plurality of motors. The operations may also include causing a plurality of motor driver boards to control the plurality of motors of the robotic system in response to determining the error condition of the robotic system. The operations may also include receiving one or more commands from the plurality of motor driver boards. The operations may also include causing the robotic system to move to a stationary position and park the robotic system in the stationary position based on the received one or more commands from the plurality of motor driver boards.

In yet another implementation, a system is provided. The system may include a means for controlling, by a robotic system, a plurality of motors of the robotic system with a central processing unit (CPU). The system may also include a means for determining, by the robotic system, an error condition of the robotic system, where the error condition prevents the CPU from controlling at least one of the plurality of motors. The system may also include a means for causing a plurality of motor driver boards to control the plurality of motors of the robotic system in response to determining the error condition of the robotic system. The system may also include a means for receiving, by the plurality of motors, one or more commands from the plurality of motor driver boards. The system may also include a means for causing the robotic system to move to a stationary position and park the robotic system in the stationary position based on the received one or more commands from the plurality of motor driver board.

These as well as other implementations, aspects, advantages, and alternatives will become apparent to those of ordinary skill in the art by reading the following detailed description, with reference where appropriate to the accompanying drawings. Further, this summary and other descriptions and figures provided herein are intended to illustrate implementations by way of example only and numerous variations are possible. For instance, structural elements and process steps can be rearranged, combined, distributed, eliminated, or otherwise changed, while remaining within the scope of the implementations as claimed.

DETAILED DESCRIPTION

Example implementations are described herein. The words "example" and "exemplary" are used herein to mean "serving as an example, instance, or illustration." Any implementation or feature described herein as being an "example" or "exemplary" is not necessarily to be construed as preferred or advantageous over other implementations or features. Other implementations can be utilized, and other changes can be made, without departing from the scope of the subject matter presented herein.

Thus, the example implementations described herein are not meant to be limiting. The aspects of the present disclosure, as generally described herein, and illustrated in the figures, can be arranged, substituted, combined, separated, and designed in a wide variety of different configurations, all of which are explicitly contemplated herein.

I. Overview

A robotic system may be a humanoid robot with two robotic legs that bear the weight of the robotic system. For example, the weight of the robotic system may rest on each of the robotic legs while the robotic system is in a standing position. As such, approximately half of the weight may be supported by one robotic foot and approximately half of the weight may be supported by the other robotic foot. The robotic system may further include two arms that may be configured to move to perform various operations.

The arms and legs of an example robotic device may include one or more motors used to control movement of those components. The motors may be in communication with a main central processing unit (CPU) that carries out various operations of the robotic system. It may be advantageous for the robotic system to include procedures and systems for shutting down the robotic systems in a manner designed to prevent damage to the robotic system in the event the robotic system experiences an error condition. Such error conditions may include the main CPU board becoming unresponsive, the main CPU rebooting, or a loss of communication between the main CPU board and one or more motors, as examples.

In normal operation, each of the motors in an example robotic system may be controlled by the main CPU, and the CPU may thereby control each of the motors. However, each of the motors of the robotic system may also include individual motor driver boards that are configured to control the respective motors in certain situations. Such motor driver boards may include a circuit board coupled to a device or group of devices that serves to govern in some predetermined manner the performance of the motors. For example, if the robotic system determines that it is experiencing an error condition, each motor driver board may assume control of its respective motor. In some examples, a given motor driver board may be used to control two or more motors of the plurality of motors.

As a specific example, a robotic system may be walking when it encounters an error condition due to a failure of the main CPU board. The robotic system may require continued use of the motors in order to prevent the robotic system from falling over and damaging the robotic system. Therefore, in order to prevent the robotic system from falling, the individual motor boards may assume control of their respective motors, and further initiate movement to a stationary position. In one particular implementation, the robot may have pre-computed trajectories to such stationary positions. These positions may place the robotic system to a stand-still or otherwise stable position without falling.

In one example, the trajectories may be computed every N seconds, taking into account real-time positions, velocities, and actions of the robotic system to reconfigure the trajectories of the robotic system. The trajectories can be stored and accessed if needed for execution by the robotic system. Upon detection of an error condition of the robotic system, the motor driver boards can be programmed to follow the trajectory that is in storage at that time.

II. Example Robotic Systems

Figure 1:
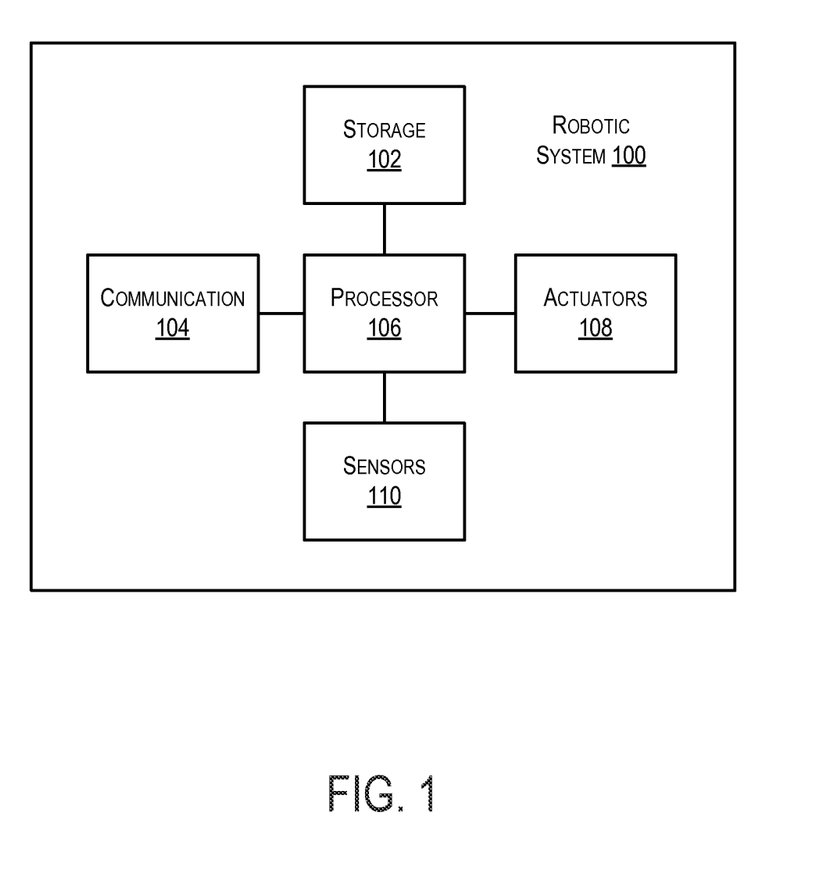
FIG. 1 depicts as simplified block diagram of a robotic system, according to an example implementation.

FIG. 1 depicts aspects of a robotic system, according to an example implementation. In some examples, robotic system 100 may include computer hardware, such as a storage 102, a communication component 104, a processor 106, actuators 108, and sensors 110. For example, one or more of these hardware components may be designed for a robotic system 100 such as a humanoid robot and/or a bipedal-robot device. While the implementations described herein show bipedal robotic systems, other robotic systems are contemplated as well. For example, quadruped or wheeled robotic systems may be operable to perform the various operations described herein.

Storage 102 may be a memory that includes a non-transitory computer-readable medium having stored thereon program instructions. The processor 106 may be coupled to the storage 102 to cause the robotic system 100 to perform operations based on executing these program instructions. Further, the processor 106 may be coupled to the communication component 104 for communicating with other robotic systems, robots, and/or devices. For example, communication component 104 may be used to access one or more server devices of a network. In some implementations, communication component 104 may include a wired connection including, for example, a parallel bus or a serial bus such as a Universal Serial Bus (USB). Further, communication component 104 may include a wireless connection including, for example, Bluetooth, IEEE 802.11, Cellular (such as GSM, CDMA, UMTS, EV-DO, WiMAX, or LTE), or Zigbee, among other possibilities.

Processor 106 may store, in the storage 102, data obtained from the sensors 110. In some examples, sensors 110 may include a gyroscope, an accelerometer, a Doppler sensor, a sonar sensor, a radar device, a laser-displacement sensor, and/or a compass, possibly to measure locations and/or movements of the robotic system 100. Yet further, sensors 110 may include an infrared sensor, an optical sensor, a light sensor, a camera, a biosensor, a capacitive sensor, a touch sensor, a temperature sensor, a wireless sensor, a radio sensor, a sound sensor, and/or a smoke sensor, possibly to obtain data indicative of an environment of the robotic system 100. In addition, sensors 110 may include a sensor that measure forces acting about the robotic system 100. For example, sensors 110 may include a sensor that measures forces (e.g., inertial forces and/or G-forces) in multiple dimensions. Further, sensors 110 may include a sensor that measures torque (possibly referred to herein as a "force-torque sensor"), a sensor that measures ground forces (possibly referred to a "ground force sensor" and/or a "friction sensor"), and a zero moment point (ZMP) sensor that identifies ZMPs and/or locations of the ZMPs, among other possibilities.

The robotic system 100 may also have actuators 108 that enable the robotic system 100 to initiate movements. For example, the actuators 108 may include or be incorporated with robotic joints connecting robotic limbs to a robotic body. For example, the actuators 108 may include robotic hip joints connecting robotic legs to the robotic body. Further, the actuators 108 may include robotic knee joints connecting parts (e.g., robotic thighs and robotic calves) of the robotic legs. Yet further, the actuators 108 may include robotic ankle joints connecting the robotic legs to robotic feet. In addition, the actuators 108 may include motors for moving the robotic limbs. As such, the actuators 108 may enable the mobility of the robotic system 100 in various environments.

The robotic system 100 may include one or more direct current (DC) motors, permanent magnet motors, fuel powered motors (e.g., gasoline and/or gas powered motors), and/or servo motors to move the robotic limbs. Such motors may allow the robotic system 100 to have precise control of its actuators 108 and the movement of the robotic limbs. Yet, such motors may also be heavy, thereby causing the robotic system 100 to consume more power to move robotic limbs. Further, the weight of the motors may cause the robotic legs to make heavy impacts with the ground, possibly damaging the robotic legs over time and/or after traveling long distances. In some implementations, the robotic system 100 may include hydraulic mechanisms to move the robotic limbs. The hydraulic systems may give the robotic system 100 more strength, enabling the robotic system 100 to lift heavy objects. Yet, the hydraulic mechanisms may require pumps that may be bulky, taking up additional space in the robotic system. In addition, the hydraulic mechanisms may be difficult to control such that the robotic movements may appear spastic, jerky, and/or less precise.

Thus, the robotic system 100 may include smaller and/or lightweight motors to move the robotic limbs. Yet, such motors may encounter challenges as well. For example, the actuators 108 with smaller motors may deliver a limited amount of power. Thus, decreasing the size of motors may cause the robotic system 100 to be weaker. Further, driving the motors at higher speeds may cause the motors to emanate thermal energy, possibly overheating the robotic system. Yet further, it may be difficult to determine the internal temperature of the motors to prevent the robotic system from overheating.

The motors of the robotic system 100 may be in communication with a main CPU, such as processor 106. The main CPU may be configured to carry out various operations on the robotic system 100, such as controlling the motors. The main CPU may be located within the robotic system 100, or may be in wired or wireless communication with the robotic system 100. In addition, each of the motors of the robotic system 100 may include individual motor driver boards that are configured to control each of the respective motors in certain situations, as discussed in more detail below.

Figure 2:
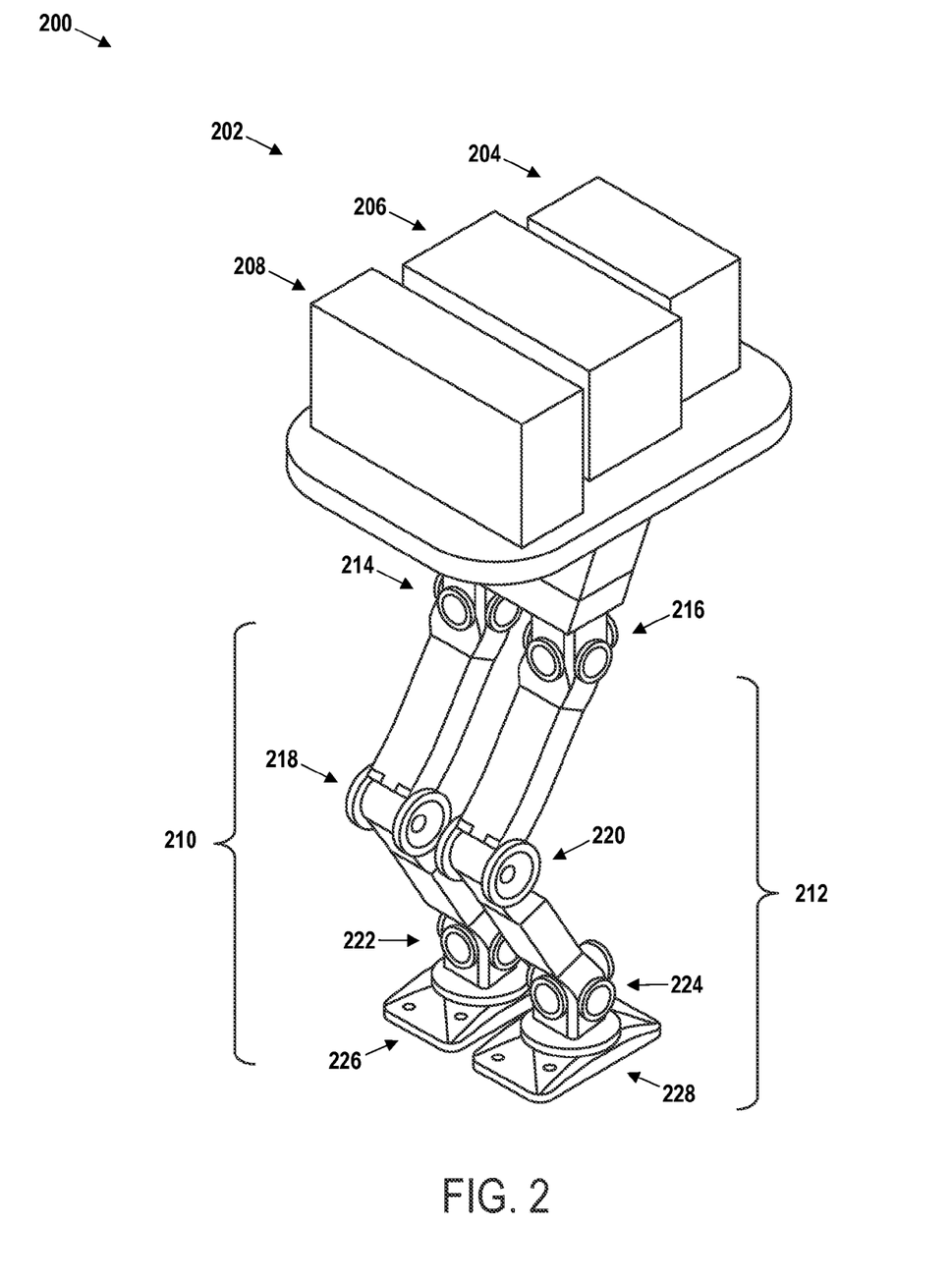
FIG. 2 depicts aspects of a robotic system, according to an example implementation.

FIG. 2 depicts aspects of a robotic system, according to an example implementation. The robotic system 200 may include, for example, one or more parts of the robotic system 100 in relation to FIG. 1. For example, the robotic legs 210 and 212 may include sensors 110, such as sensors that measure inertial forces and/or G-forces in multiple dimensions, a force-torque sensor, a ground force sensor, a friction sensor, and/or a ZMP sensor, among other possibilities.

As shown, a robotic body 202 that may include a battery 204, a radiator 206, and a capacitor 208. The robotic system 200 may also include two robotic hips 214 and 216, connecting the robotic body 202 to two robotic legs 210 and 212, respectively. Further, the two robotic legs 210 and 212 may include two robotic knee joints 218 and 220, two robotic ankle joints 222 and 224, and two robotic feet 226 and 228, respectively. In some implementations, the robotic system 200 may weigh approximately 30 to 80 kilograms.

Battery 204 may be used to power the robotic system 200. Radiator 206 may transfer thermal energy from one part of the robotic system 200 to another for cooling the robotic system 200. The radiator 206 may provide liquids to cool the motors in the robotic system 200. Capacitor 208 may be a multi-layered capacitor (e.g., a double-layered capacitor) operable to produce current in a shortened period of time. The capacitor 208 may produce currents to power the motors when the available power capacity in the capacitor 208 is lower than one or more capacity thresholds. For example, the capacitor 208 may supply varying amounts of current to motors and drivers in the robotic legs 210 and 212, possibly more reliably than the battery 204. In some instances, the capacitor 208 may operate with an approximate voltage of 50-150 V, an approximate capacitance of 7-21 farads, and an approximate internal resistance of 25-150 mΩ.

The robotic system 200 may include one or more motors powered by the capacitor 208. For example, the robotic system 200 may include one or more motors that generate heat and are cooled by lower temperature liquids around the motors. For example, the robotic knee joints 218 and 220 may include motors cooled by liquids to achieve rotational speeds over approximately 1,000-2,000 degrees per second and over approximately 350-700 newton meters (Nm) of torque.

Further, the motors cooled by liquids may be used to move robotic hips 214 and 216. Additionally, these motors may be used to move the robotic legs 210 and 212. In particular, these motors may be positioned in the robotic knee joints 218 and 220, and the robotic ankle joints 222 and 224. As such, the robotic system 200 may engage in bipedal walking, possibly resembling the walking patterns of a human person. The weight of the robotic system 200 may shift on to each of the robotic legs 210 and 212 interchangeably. In particular, the robotic system 200 may shift the weight on to the robotic foot 226 as the robotic leg 212 swings forward to take a step. Further, the robotic system 200 may shift the weight on to the robotic foot 228 as the robotic leg 210 swings forward to take a step.

As discussed above, the motors of the robotic system 200 may be in communication with a main CPU that carries out various operations on the robotic system 200. In addition, each of the motors of the robotic system 200 may include individual motor driver boards that are configured to control each of the respective motors in certain situations, as discussed in more detail below.

The robotic system 200 may be operable through remote controls. Yet, the robotic system 200 may also be operable autonomously. For example, the robotic system 200 may include control algorithms that maintain the stability and balance of the robotic system 200. These algorithms may implement a push-recovery capability such that the robotic system 200 may maintain its balance after a force is applied to the robotic system 200. This capability may cause the robotic system 100 to reposition the robotic legs 210 and 212, and the robotic feet 226 and 228. For instance, the robotic system 200 may maintain balance on the robotic legs 210 and 212, and the robotic feet 226 and 228 after being hit, kicked, and/or shoved. The robotic system 200 may be capable of computing approximately 70 to 270 placements of the robotic legs 210 and 212, and the robotic feet 226 and 228 in less than approximately 0.1-1 milliseconds.

III. Examples of Operations

Figure 3:
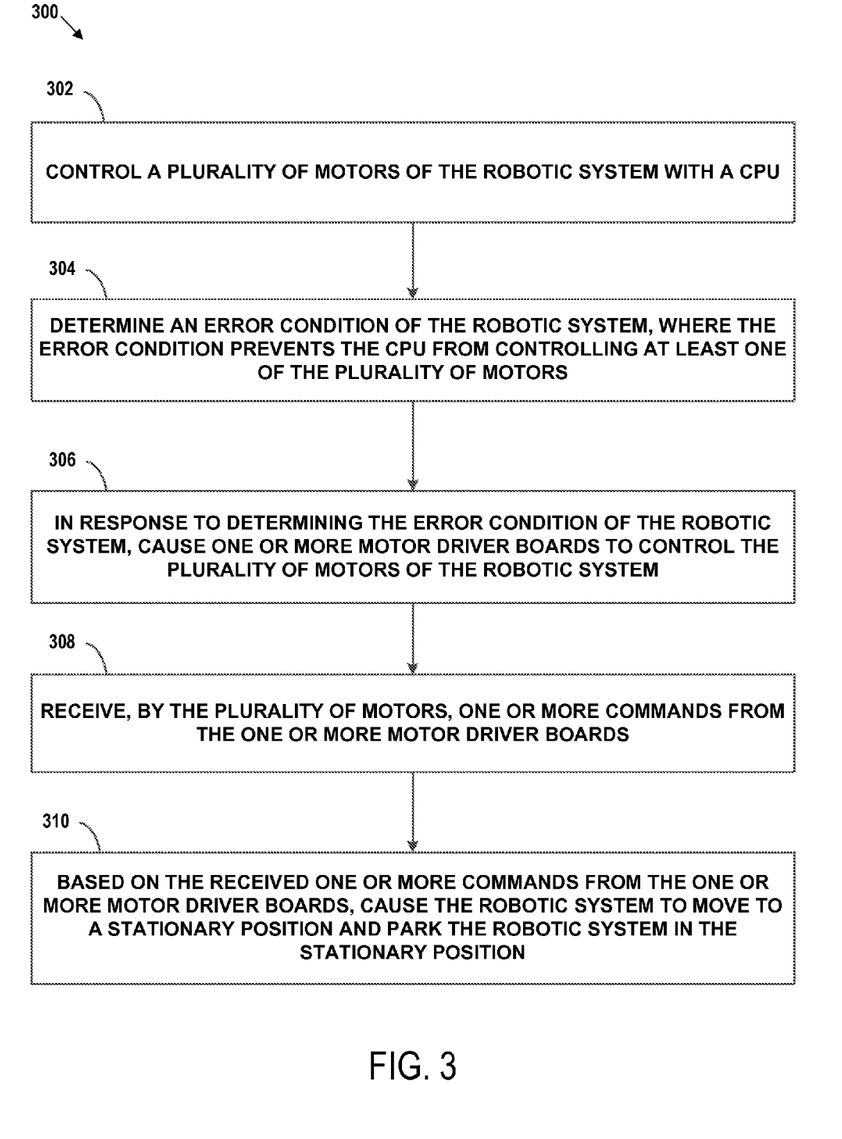
FIG. 3 is a flow chart, according to example implementations.

FIG. 3 is flow chart 300, according to example implementations. The implementations may be carried out by one or more of the robotic systems as described above in relation to FIGS. 1-2. Flowchart 300 may include one or more operations, functions, or actions as illustrated by one or more of blocks 302-310. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the flowchart 300 and other procedures and operations disclosed herein, the block diagram illustrates a possible implementation. In this regard, each block may represent a module, a segment, or a portion of program code, which includes one or more instructions executable by a processor or computing device for implementing specific logical operations. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

In addition, each block in FIG. 3 may represent circuitry that is wired to perform the specific logical operations.

At block 302, the flowchart 300 includes controlling a plurality of motors of the robotic system with a CPU. The CPU may include one or more processors, such as the processor 106 described above in relation to FIG. 1. As discussed above, the plurality of motors may be used to control the movements of various joints of the robotic system. For example, the plurality of motors may be used to control the robotic knee joints 218 and 220, the robotic ankle joints 222 and 224, and the robotic hips 214 and 216 of robotic system 200 described above in relation to FIG. 2. The plurality of motors may be in wired or wireless communication with the CPU, and the CPU may be configured to carry out various operations on the robotic system. In normal operation, each of the motors in the example robotic system may be tied to the CPU, and the CPU may thereby control each of the plurality of motors. For example, the CPU may control the plurality of motors to cause the robotic system to walk, run, pick up an object, or perform a variety of other tasks.

At block 304, the flowchart 300 continues with determining an error condition of the robotic system. The error condition may be defined by the robotic system as a condition that prevents the CPU from controlling at least one of the plurality of motors of the robotic system. In one example, the error condition of the robotic system comprises a loss of communication between the CPU and at least one of the plurality of motors. With reference to FIG. 1, the error condition may include damage to the communication component 104, as an example. As described above, the CPU may communicate with the plurality of motors via a wired or a wireless connection. Therefore, in one example, the error condition may include damage to the wired connection between the CPU and at least one of the plurality of motors. In another example, the error condition may include a problem with the wireless communication system of the robotic system. In yet another example, the error condition of the robotic system may include a failure of the CPU. Other example error conditions are possible as well.

At block 306, the flowchart 300 continues with causing one or more motor driver boards to control the plurality of motors of the robotic system in response to determining the error condition of the robotic system. As such, the robotic system may transfer control of the plurality of motors from the CPU to the one or more motor driver boards. Such motor driver boards may include a circuit board coupled to a device or group of devices that serves to govern in some predetermined manner the performance of the plurality of motors. In one example, each of the plurality of motors includes a single motor driver board used to control a given motor if the robotic system determines that the robotic system is experiencing an error condition. In another example, a given motor driver board may be used to control two or more motors of the plurality of motors.

The one or more motor driver boards may be in communication with one another to synchronize control of the plurality of motors. Further, the one or more motor driver boards may include cache memories used to store data relating to controlling a given motor. Such data may be used by a given motor driver board to cause a given motor to perform various operations, such as stopping the motor, selecting forward or reverse rotation, selecting and regulating the speed, regulating or limiting the torque, and protecting against overloads and faults. These operations may be used to cause the robotic system to walk, run, pick up an object, or perform a variety of other tasks. Still further, the one or more motor driver boards may include a microprocessor to control power electronic devices used for motor control. The motor drive boards may monitor the load on a given motor and accordingly match motor torque to motor load.

At block 308, the flowchart 300 continues with receiving one or more commands from the one or more motor driver boards. For example, a robotic system may be walking when it detects an error condition. The robotic system may require continued use of the motors in order to maintain a stance. To prevent the robotic system from falling, the one or more motor driver boards may transmit one or more commands to initiate a stopping mechanism, such as initiating a trajectory of the robotic system to a stand-still position in a position that prevents the robotic system from falling. Other commands are possible as well, as discussed in more detail below.

At block 310, the flowchart 300 continues with causing the robotic system to move to a stationary position and park the robotic system in the stationary position based on the received one or more commands from the one or more motor driver boards. When the robotic system is parked in the stationary position, the robotic system is at a stand-still or otherwise in a stationary position. Parking the robotic system in the stationary position may reduce the likelihood of damage to the robotic system. In one example, the robotic system may include one or more sensors, such as sensors 110 described above in relation to FIG. 1. In such an implementation, the robotic system may be configured to obtain sensor data from the one or more sensors that is indicative of an environment surrounding the robotic system. The stationary position of the robotic system may then be determined based on the environment surrounding the robotic system. For example, the sensor data may indicate an obstacle in the environment surrounding the robotic system. In such an example, determining the stationary position of the robotic system may include navigating the robotic system to avoid contact with the obstacle. Parking the robotic system in the stationary position may include causing the robotic device to take multiple steps from its initial position to the stationary position. All of these steps may be performed without receiving input from the main CPU.

In one particular implementation, the robotic system may have a pre-computed trajectory to a given stationary position. For example, a particular robotic system may be programmed with a predetermined location, such that when the robotic system detects an error condition, the robotic system causes the one or more motor driver boards to move the robotic system to the predetermined location.

In another example, the robotic system may determine the stationary position on a situation-by-situation basis. In such an example, causing the robotic system to move to the stationary position may include determining a confidence level of parking the robotic system at a given location, determining that the confidence level exceeds a target threshold, and in response to determining that the confidence level exceeds the target threshold, parking the robotic system at the given location. As a specific example, the robotic system may define a confidence scale from 1 to 0, where 0 is zero confidence and 1 is completely confident. In a particular example, the target threshold may be 0.7, such that the robotic system will only park itself at a particular location if the determined confidence level is greater than 0.7.

Further, the confidence level of parking the robotic system at the given location may be determined based on sensor data indicating the environment surrounding the robotic system. The sensor data may include information indicating obstacles present in the environment, and such information may be used to determine a score indicating a confidence level. If the sensor data indicates that there are few obstacles present in the path of the robotic system from its current location to the determined location, the confidence level may exceed the target threshold, and the robotic system may park at the determined location. However, if the sensor data indicates that there are several obstacles present in the path of the robotic system from its current location to the determined location, the confidence level may be low, and the robotic system may determine an alternative stationary position.

In another example, the environment of the robotic system may include a plurality of predetermined stationary positions. In such an example, causing the robotic system to move to the stationary position may include determining a location of the robotic system in the environment of the robotic system, determining a given stationary position of the plurality of stationary positions that is nearest the determined location, and navigating the robotic system to the given stationary position. For example, the robotic system may be configured to operate in a warehouse. The warehouse may include a plurality of predetermined stationary positions at different locations in the warehouse. As such, when the robotic system detects the error condition, the robotic system may determine the closest stationary position and navigate to that location assuming that the stationary position contains no obstacles and the path of the robotic system from its current location to the stationary position is not blocked. In another example, moving to a stationary position and parking the robotic system in the stationary position may include simply moving to a stable stance such that both feet of the robotic system are on the ground, and then parking the robotic system at that location.

In yet another example, the stationary positions may be computed on a continual basis, taking into account real-time positions, velocities, accelerations and actions of the robotic system. For example, the stationary positions may be computed every N seconds, where N is between 1 and 10. Other example intervals are possible as well. The updated stationary positions can be stored in the one or more motor driver boards and accessed when needed for execution by the robotic system. Upon detection of an error condition of the robotic system, the motor driver boards can be programmed to cause the robotic system to move to the stationary position that is in storage at that time.

The robotic system may further be configured to transmit an error message indicating the error condition of the robotic system. The robotic system may transmit the error message for receipt by a computing device, such as a computing device used to monitor a plurality of robotic systems, as an example. The error message may provide an indication of an option to switch to a manual mode of operation for the robotic system, in response to detecting the error condition. In such a case, a user may cause the robotic system to move to the stationary position and park the robotic system in the stationary position. In addition, the robotic device may provide visual feedback of the error condition of the robotic system via an indicator on the robotic system. The indicator may provide the visual feedback using one or more of blinking lights, light patterns, or color patterns using one or more light emitting diodes (LEDs), as an example.

The flowchart 300 of FIG. 3, as well as other methods in the scope of this disclosure, can be carried out in whole or in part by a robotic system and its subsystems. In some implementations, the flowchart 300 can be implemented in whole or in part by one or more computing devices. For example, the flowchart 300 can be implemented in whole or in part by a server system, which receives data from a device that is associated with a robotic system. Other examples of computing devices or combinations of computing devices that can implement the flowchart 300 are possible as well.

In some implementations, the flowchart 300, as well as other methods in the scope of this disclosure, can be implemented as computer program instructions encoded on a non-transitory computer-readable storage media in a machine-readable format, or on other non-transitory media or articles of manufacture.

IV. Additional Examples of Robotic Systems

Figure 4:
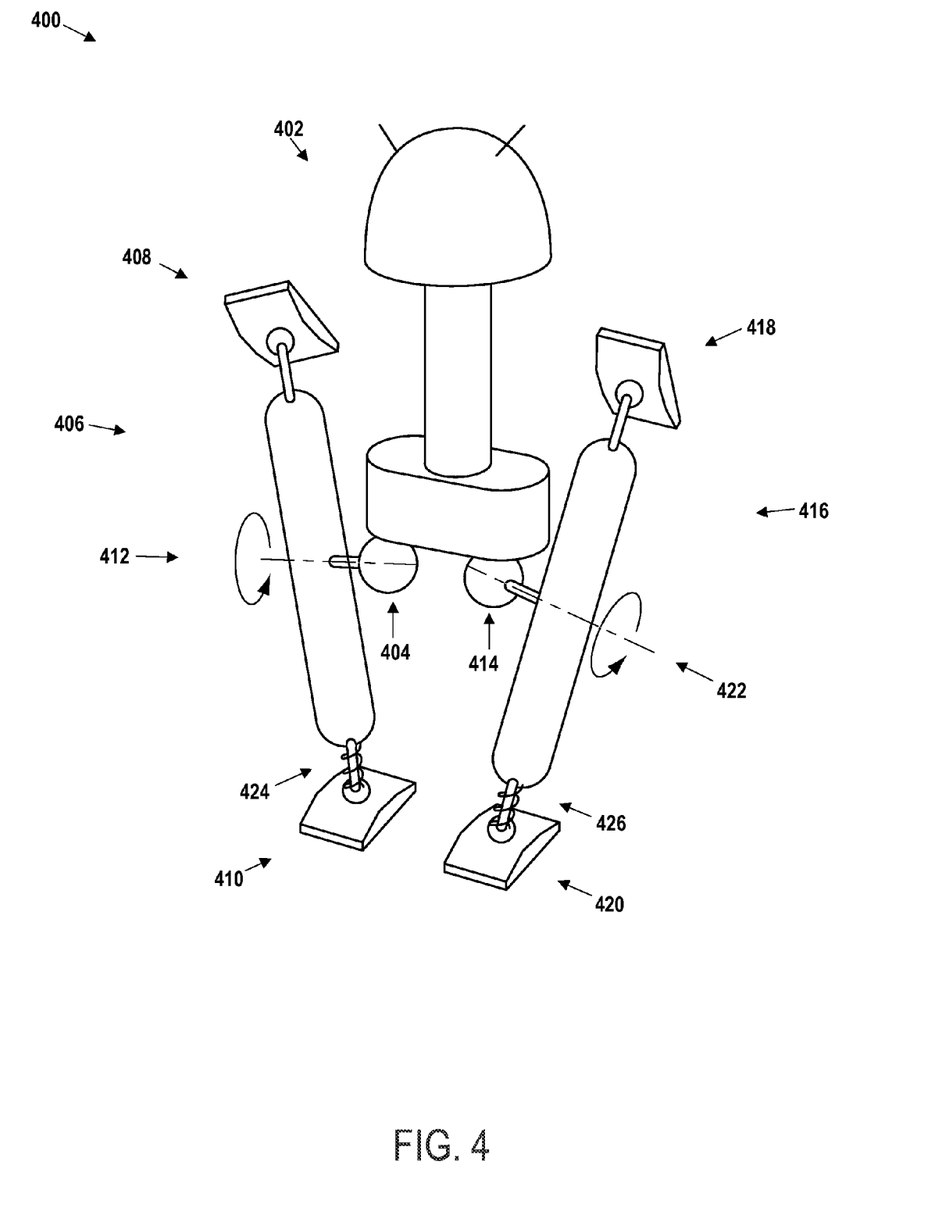
FIG. 4 depicts aspects of an example model of a robotic system, according to an example implementation.

FIG. 4 depicts aspects of a robotic system, according to an example implementation. The robotic system 400 may take, for example, the form of a bipedal robot device and/or a multi-legged robot device such as a quadruped robot device, among various possibilities. Further, the robotic system 400 may include, for instance, one or more of the parts described above in relation to robotic systems described above in relation to FIGS. 1 through 3.

As shown in FIG. 4, the robotic system 400 may include a robotic body 402, a robotic hip 404 connected to the robotic body 402, and a robotic leg 406 connected to the robotic hip 404. A first robotic foot 408 may be connected to one end of the robotic leg 406 and a second robotic foot 410 may be connected to an opposite end of the robotic leg 406. The robotic leg 406 may be fully rotatable around an axis of rotation 412 defined by the robotic hip 404. Further, the robotic hip 404 may be linearly movable along the robotic leg 406 to one or more positions between the one end of the robotic leg 406 and the opposite end of the robotic leg 406.

Yet further, the robotic system 400 may include a second robotic hip 414 connected to the robotic body 402 and a second robotic leg 416 connected to the second robotic hip 414. A third robotic foot 418 may be connected to one end of the second robotic leg 416 and a fourth robotic foot 420 may be connected to an opposite end of the second robotic leg 416. The second robotic leg 416 may be fully rotatable around a second axis of rotation 422 defined by the second robotic hip 414, as shown by the circular arrow around the second axis of rotation 422. In addition, the second robotic hip 414 may be linearly movable along the second robotic leg 416 to one or more positions between the one end of the second robotic leg 416 and the opposite end of the second robotic leg 416. For example, the second robotic hip 414 may be linearly moveable along the robotic leg 416 to one or more positions between the third robotic foot 418 and the fourth robotic foot 420.

Further, the robotic leg 406 and the second robotic leg 418 may be partially or fully rotatable in the opposite directions of the circular arrows around the axes of rotation 412 and 422, respectively. The robotic legs 406 and 418 may rotate over varying axes of rotation 412 and 422, respectively. For example, the robotic hips 404 and 414 may be moveable over multiple degrees of freedom (DOF) to vary the axes of rotation 412 and 422, respectively. In particular, the robotic hips 404 and 406 may include ball and socket mechanisms to be movable over the multiple DOF, possibly to change the axes of rotation 412 and 422, respectively.

In some implementations, the robotic system 400 may include different types of robotic feet, possibly for bipedal walking without the windmill type movements. For example, the second robotic foot 410 may include a rubber base that facilitates friction against adjacent surfaces. For example, the rubber base may take the form of a rain shoe that creates friction against the adjacent surfaces covered in rain, snow, and/or other forms of liquids. Further, the first robotic foot 408 may include a wider base than the rubber base. For example, the wider base may distribute the weight of the robotic system 400 over more area of the adjacent surfaces than the rubber base. In some implementations, the wider base may take the form of a snow shoe that distributes the weight of the robotic system 400 over more area of the adjacent surfaces covered in snow. Further, the third robotic foot 418 may take any of the forms of the robotic foot 408 and the fourth robotic foot 420 may take any of the forms of the robotic foot 410, among other possibilities.

In some implementations, the robotic system 400 may include different types of robotic legs and/or robotic feet for various types of movements of the robotic system 400. Further, the robotic system 400 may include different types of feet for walking, jogging, running, and/or jumping. For example, the robotic foot 408 and the third robotic foot 418 may be used for walking, and the second robotic foot 410 and the fourth robotic foot 420 may be used for running and jumping, among other possibilities. Further, the robotic leg 406 may include a first spring 424 that applies a first force against the second robotic foot 410. Further, the second robotic leg 416 may include a second spring 426 that applies a second force against the fourth robotic foot 420. As such, the first spring and the second spring may store energy for applying the first force and the second force, respectively, thereby springing the robotic system 402 off ground surfaces.

In some implementations, the robotic system 400 may include a non-transitory computer-readable medium that stores program instructions executable by one or more processors, such as the processor 106 of the robotic system 100 described above in relation to FIG. 1. The program instructions may cause the robotic system 400 to perform operations. For example, the robotic hip 404 may move along the robotic leg 406 to a first position of the one or more positions between the one end of the robotic leg 406 and the opposite end of the robotic leg 406. Further, the second robotic hip 414 may move along the second robotic leg 416 to a second position of the one or more positions between the one end of the second robotic leg 416 and the opposite end of the second robotic leg 416.

In some implementations, a first length of the robotic leg 406 may be approximately equivalent to a second length of the second robotic leg 416. For example, the first position may be approximately half way between the one end of the robotic leg 406 proximately connected to the first robotic foot 408 and the opposite end of the robotic leg 406 proximately connected to the second robotic foot 410. Further, the second position may be approximately half way between the one end of the second robotic leg 416 proximately connected to the third robotic foot 418 and the opposite end of the second robotic leg 416 proximately connected to the fourth robotic foot 420. As such, the robotic system 400 may stand such that the robotic hip 404 may be approximately level with the second robotic hip 414.

In some implementations, the robotic system 400 may cause the robotic leg 406 to rotate up to 360 degrees around the axis of rotation 412 defined by the robotic hip 404 and cause the second robotic leg 416 to rotate up to 360 degrees around the second axis of rotation 422 defined by the second robotic hip 414. In particular, the robotic leg 406 and the second robotic leg 416 may rotate with an approximate phase difference of 90 degrees. Thus, the robotic leg 406 may rotate first followed by the second robotic leg 416 rotating thereafter.

In some implementations, the robotic system 400 may cause the robotic leg 406 up to rotate up to 180 degrees around the axis of rotation 412 defined by the robotic hip 404, where the weight of the robotic system 400 is shifted from being placed on the second robotic foot 410 to the first robotic foot 408. In particular, the robotic leg 406 may rotate in the direction of the circular arrow around the axis of rotation 412, thereby switching the weight from being placed on the second robotic foot 410 to the first robotic foot 408.

Further, the robotic system 400 may cause the second robotic leg 416 to rotate up to 180 degrees around the second axis of rotation 422 defined by the second robotic hip 414, where the weight of the robotic system is shifted from being placed on the fourth robotic foot 420 to the third robotic foot 418. In particular, the second robotic leg 416 may rotate in the direction of the circular arrow around the axis of rotation 422, thereby switching the weight from being placed on the fourth robotic foot 420 to the third robotic foot 418. Based on causing the robotic leg 412 and the second robotic leg 422 to rotate, the robotic system 400 may take an initial step with the first robotic foot 408 and a subsequent step with the third robotic foot 418.

Movement of the first robotic hip 404 and the second robotic hip 414 may be controlled by one or more motors. The one or more motors of the robotic system 400 may be in communication with a main CPU that carries out various operations on the robotic system 400. In addition, each of the motors of the robotic system 400 may include individual motor driver boards that are configured to control each of the respective motors in certain situations, such as those situations discussed above in relation to FIG. 3. In one implementation, the motor driver boards may be positioned near the first robotic hip 404 and the second robotic hip 414.

In particular, the robotic system 400 may be configured to move to a stationary position and park the robotic system 400 in the stationary position based on received commands from the motor driver boards. Moving to the stationary position may include moving to a stable stance such that two of the feet of the robotic system 400 are on the ground, and then parking the robotic system at that location. The robotic system 400 may need to slow down before stopping so that it does not fall forward by stopping abruptly. Other examples are possible as well, as discussed above in relation to FIG. 3.

Figure 5:
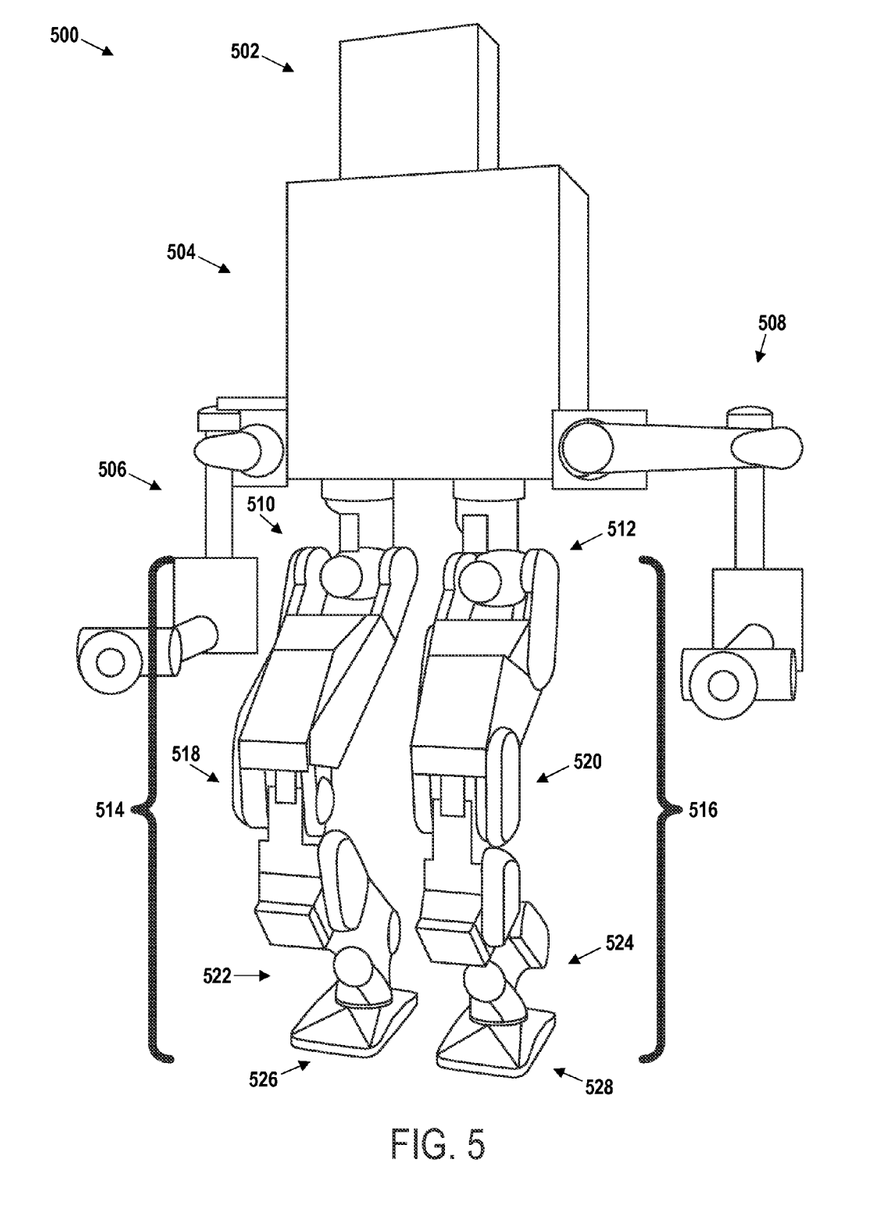
FIG. 5 depicts aspects of another example model of a robotic system, according to an example implementation.

FIG. 5 depicts a robotic system, according to an example implementation. The robotic system 500 may include, for example, one or more parts of the robotic systems described above in relation to FIGS. 1-4. For example, the robotic legs 514 and 516 may include sensors 110 such as a sensor that measures inertial forces and/or G-forces in multiple dimensions, a force-torque sensor, a ground force sensor, a friction sensor, and/or a ZMP sensor, among other possibilities. Further, the robotic system 500 may include one or more motors that generate heat and are cooled by lower temperature liquids around the motors. As such, the robotic system 500 may also engage in bipedal walking.

The robotic system 500 may include a robotic head 502, a robotic body 504, two robotic arms 506 and 508, two robotic hips 510 and 512, and two robotic legs 514 and 516. Further, the robotic legs 514 and 516 may include two robotic knees 518 and 520, two robotic ankles 522 and 524, and two robotic feet 526 and 528, respectively. As such, the robotic system 500 may be capable of using robotic arms 506 and 508 to interact with an environment, possibly beyond the capabilities of the robotic system 500. Movement of one or more of the components of the robotic system 500 may be controlled by one or more motors of the robotic system 500. The one or more motors of the robotic system 500 may be in communication with a main CPU that carries out various operations on the robotic system 500. In addition, each of the motors of the robotic system 500 may include individual motor driver boards that are configured to control each of the respective motors in certain situations, such as those situations discussed above in relation to FIG. 3. The motor driver boards may be positioned near one or more of the two robotic arms 506 and 508, the two robotic hips 510 and 512, the two robotic knees 518 and 520 and the two robotic ankles 522 and 524.

In particular, the robotic system 500 may be configured to move to a stationary position and park the robotic system 500 in the stationary position based on received commands from the motor driver boards. Moving to the stationary position may include moving to a stable stance such that the two feet 526 and 528 of the robotic system 500 are on the ground, and then parking the robotic system at that location. Further, the motor driver boards may cause the robotic system 500 to position the two robotic arms 506 and 508 to a downward position. Other examples are possible as well, as discussed above in relation to FIG. 3.

Figure 6:
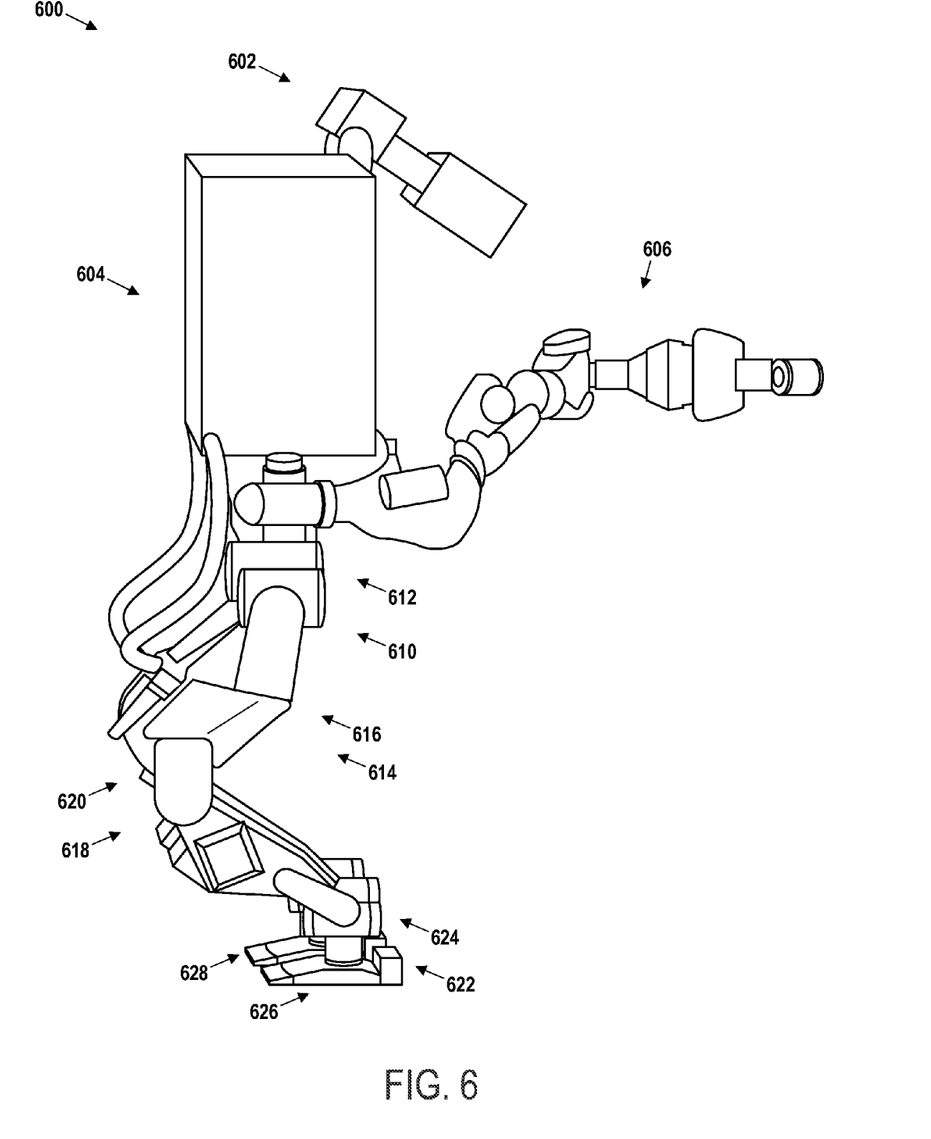
FIG. 6 depicts aspects of yet another example model of a robotic system, according to an example implementation.

FIG. 6 depicts aspects of a robotic system, according to an example implementation. The robotic system 600 may include, for example, one or more parts of the robotic systems described above in relation to FIGS. 1-5. As shown, FIG. 6 may illustrate a side view of the robotic system 600. The robotic system 600 may include a robotic head 602, a robotic body 604, a robotic arm 606, a robotic hip 610, a second robotic hip 612, a robotic leg 614, and a second robotic leg 616. Further, the robotic legs 614 and 616 may include a robotic knee 618 and a second robotic knee 620, respectively. Further, the robotic legs 614 and 616 may include a robotic ankle 622 and a second robotic ankle 624, and a robotic foot 626 and a second robotic foot 628, respectively. As discussed above, movement of one or more of the components of the robotic system 600 may be controlled by one or more motors of the robotic system 500. The one or more motors of the robotic system 600 may be in communication with a main CPU to control the one or more motors in some situations, and individual motor driver boards that are configured to control each of the respective motors in other situations, as discussed above in relation to FIG. 3. The motor driver boards may be positioned near one or more of the robotic arm 606, the two robotic hips 610 and 612, the two robotic knees 618 and 620 and the two robotic ankles 622 and 624.

In particular, the robotic system 600 may be configured to move to a stationary position and park the robotic system 600 in the stationary position based on received commands from the motor driver boards. Moving to the stationary position may include moving to a stable stance such that the two feet 626 and 628 of the robotic system 600 are on the ground, and then parking the robotic system at that location. Further, the motor driver boards may cause the robotic system 600 to position the robotic arm 606 to a downward position. Other examples are possible as well, as discussed above in relation to FIG. 3.

In some implementations, the robotic systems described above in relation to FIGS. 1-6 may be used in environments involving natural and human-made disasters. For example, these robotic systems may perform activities in disaster zones to help victims in the vicinity of such disaster zone. In particular, these robotic systems may adapt to various types of sites that the robotic systems may not have previously encountered. As such, these robotic systems may demonstrate some autonomy in making decisions and data obtained from sensors 110. Further, these robotic systems may be controlled remotely based on receiving one or more commands to perform operations.

For example, the robotic systems may travel through areas that may be unsafe for living beings. In particular, these robotic systems may operate in natural disaster areas affected by earthquakes, fires, natural gas leaks, and/or exposures to radioactive elements, among other possible areas. For example, the robotic system 500 of FIG. 5 may open a door using the robotic arms 506 and 508. Further, the robotic arms 506 and/or 508 may keep the door open while the robotic legs 514 and 516 walk through the doorway. The robotic system 500 may pick up debris that obstructs pathways, possibly using the robotic arms 506 and 508 to move the debris. The robotic system 500 may cut through walls using one or both of the robotic arms 506 and/or 508. For example, the robotic arm 506 may include a saw that may protrude from the robotic arm 506 such that the robotic arm 506 may be directed to cut an opening into a wall. As such, the robotic system 500 may create escape routes for saving living beings that may be trapped in confined areas.

The robotic systems may operate a diverse assortment of tools, possibly designed to be used by human persons. For example the robotic system 600 may identify a hose that may be connected to water valve. The robotic system 600 may carry the hose and connect the hose to the water valve using the robotic arm 606. Further, the robotic system 600 may use the robotic arm 606 to turn a wheel of the valve that allows water to flow through the valve and into the hose. As such, the robotic system 600 may control the valve and carry the hose to various locations, providing water to such locations.

In some implementations, the robotic systems may be used in various manufacturing facilities. For example, the robotic systems may be used in an assembly line with multiple work stations along the assembly line that add parts to a partially-finished machine. The robotic systems may move parts to various work stations on the assembly line and also from one work station to another. Further, the robotic systems may place parts on the partially-finished machine to facilitate the creation of a finished machine, among other possibilities.

V. Computer-Readable Medium Configured to Control a Robotic System

Figure 7:
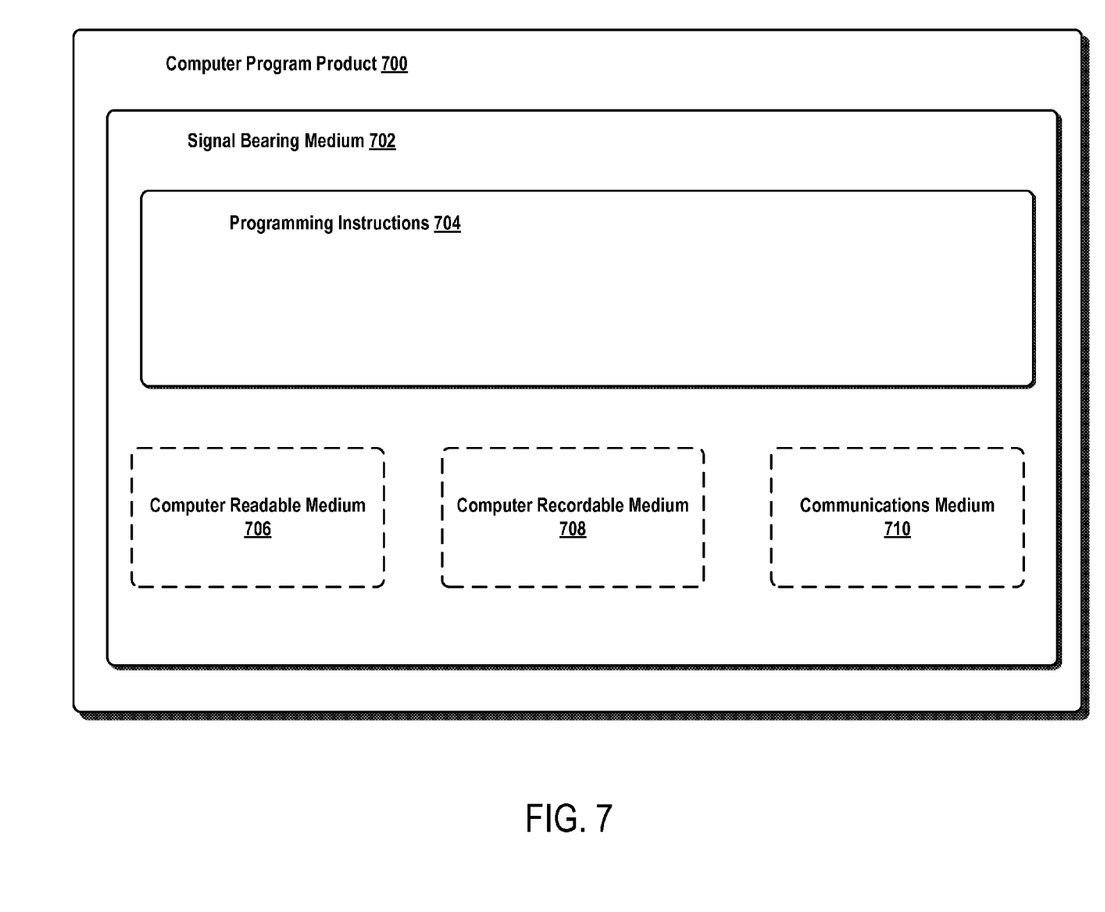
FIG. 7 depicts a computer-readable medium configured according to an example implementation.

FIG. 7 illustrates a computer-readable medium configured according to an example implementation. In example implementations, the example robotic system can include one or more processors, one or more forms of memory, one or more input devices/interfaces, one or more output devices/interfaces, and machine-readable instructions that when executed by the one or more processors cause the system to carry out the various operations, tasks, capabilities, etc., described above.

As noted above, in some implementations, the disclosed robotic systems can perform actions that may be implemented by computer program instructions encoded on a non-transitory computer-readable storage media in a machine-readable format, or on other non-transitory media or articles of manufacture. FIG. 7 is a schematic illustrating a conceptual partial view of an example computer program product that includes a computer program for executing a computer process on a computing device, arranged according to at least some implementations presented herein.

In one implementation, the example computer program product 700 is provided using a signal bearing medium 702. The signal bearing medium 702 may include one or more programming instructions 704 that, when executed by one or more processors may provide functionality or portions of the functionality described above with respect to FIGS. 1-6. In some examples, the signal bearing medium 702 can be a computer-readable medium 706, such as, but not limited to, a hard disk drive, a Compact Disc (CD), a Digital Video Disk (DVD), a digital tape, memory, etc. In some implementations, the signal bearing medium 702 can be a computer recordable medium 708, such as, but not limited to, memory, read/write (R/W) CDs, R/W DVDs, etc. In some implementations, the signal bearing medium 702 can be a communications medium 710, such as, but not limited to, a digital and/or an analog communication medium (e.g., a fiber optic cable, a waveguide, a wired communications link, a wireless communication link, etc.). Thus, for example, the signal bearing medium 702 can be conveyed by a wireless form of the communications medium 710.

The one or more programming instructions 704 can be, for example, computer executable and/or logic implemented instructions. In some examples, a computing device such as the processor 106 of FIG. 1 is configured to provide various operations, functions, or actions in response to the programming instructions 704 conveyed to the processor 106 by one or more of the computer-readable medium 706, the computer recordable medium 708, and/or the communications medium 710.

The non-transitory computer-readable medium 708 could also be distributed among multiple data storage elements, which could be remotely located from each other. The device that executes some or all of the stored instructions could be a client-side computing device. Alternatively, the device that executes some or all of the stored instructions could be a server-side computing device.

Within some examples herein, operations may be embodied on a computer program product (e.g., a tangible computer readable storage medium or non-transitory computer readable medium) that includes instructions executable to perform the operations.

VI. Conclusion

It should be understood that arrangements described herein are for purposes of example only. As such, those skilled in the art will appreciate that other arrangements and other elements (e.g. machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. It is also to be understood that the terminology used herein is for the purpose of describing particular implementations only, and is not intended to be limiting.

We claim:

1. A method comprising:
controlling, by a robotic system, a plurality of motors of the robotic system with a central processing unit (CPU);
determining, by the robotic system, an error condition of the robotic system, wherein the error condition prevents the CPU from controlling at least one of the plurality of motors;
in response to determining the error condition of the robotic system, causing a plurality of motor driver boards to control the plurality of motors of the robotic system;
receiving, by the plurality of motors, one or more commands from the plurality of motor driver boards;
based on the received one or more commands from the plurality of motor driver boards, causing the robotic system to move to a stationary position; and
parking the robotic system in the stationary position.

2. The method of claim 1, wherein each of the plurality of motors includes a single motor driver board used to control a given motor in response to determining the error condition of the robotic system.

3. The method of claim 1, wherein causing the robotic system to move to the stationary position comprises:
determining a confidence level of parking the robotic system at a given location;
determining that the confidence level exceeds a target threshold; and
in response to determining that the confidence level exceeds the target threshold, parking the robotic system at the given location.

4. The method of claim 1, wherein the stationary position of the robotic system is determined based on an environment surrounding the robotic system.

5. The method of claim 4, wherein the environment includes an obstacle, and wherein determining the stationary position of the robotic system comprises navigating the robotic system to avoid contact with the obstacle.

6. The method of claim 1, wherein the stationary position of the robotic system is determined based on one or more of a current velocity, a current position, and a current acceleration of the robotic system.

7. The method of claim 1, wherein the error condition of the robotic system comprises a loss of communication between the CPU and at least one of the plurality of motors.

8. The method of claim 1, further comprising:
transmitting an error message indicating the error condition of the robotic system; and
providing visual feedback of the error condition of the robotic system via an indicator on the robotic system.

9. The method of claim 1, wherein the plurality of motors control one or more legs of the robotic system.

10. The method of claim 1, wherein the stationary position comprises one of a plurality of stationary positions in an environment of the robotic system, and wherein causing the robotic system to move to the stationary position comprises:
determining a location of the robotic system in the environment of the robotic system;
determining a given stationary position of the plurality of stationary positions that is nearest the determined location of the robotic system; and
navigating the robotic system to the given stationary position.

11. A non-transitory computer readable medium having stored thereon instructions, that when executed by a central processing unit (CPU), cause a robotic system to perform operations comprising:

controlling a plurality of motors of the robotic system with the CPU;

determining an error condition of the robotic system, wherein the error condition prevents the CPU from controlling at least one of the plurality of motors;

in response to determining the error condition of the robotic system, causing a plurality of motor driver boards to control the plurality of motors of the robotic system;

receiving one or more commands from the plurality of motor driver boards;

based on the received one or more commands from the plurality of motor driver boards, causing the robotic system to move to a stationary position; and parking the robotic system in the stationary position.

12. The non-transitory computer readable medium of claim 11, wherein causing the robotic system to move to the stationary position comprises:

determining a confidence level of parking the robotic system at a given location;

determining that the confidence level exceeds a target threshold; and in response to determining that the confidence level exceeds the target threshold, parking the robotic system at the given location.

13. The non-transitory computer readable medium of claim 11, wherein the stationary position of the robotic system is determined based on one or more of a current velocity, a current position, and a current acceleration of the robotic system.

14. The non-transitory computer readable medium of claim 11, wherein the operations further comprise:

transmitting an error message indicating the error condition of the robotic system; and providing visual feedback of the error condition of the robotic system via an indicator on the robotic system.

15. The non-transitory computer readable medium of claim 11, wherein the stationary position comprises one of a plurality of stationary positions in an environment of the robotic system, and wherein causing the robotic system to move to the stationary position comprises:

determining a location of the robotic system in the environment of the robotic system;

determining a given stationary position of the plurality of stationary positions that is nearest the determined location of the robotic system; and navigating the robotic system to the given stationary position.

16. A robotic system comprising:

one or more robotic legs connected to a main body;

a central processing unit (CPU);

a plurality of motors including a plurality of motor driver boards; and a non-transitory data storage including program instructions stored thereon that when executed by one or more processors of the robotic system, cause the robotic system to:

control the plurality of motors of the robotic system with the CPU;

determine an error condition of the robotic system, wherein the error condition prevents the CPU from controlling at least one of the plurality of motors;

in response to determining the error condition of the robotic system, cause the plurality of motor driver boards to control the plurality of motors of the robotic system;

receive one or more commands from the plurality of motor driver boards;

based on the received one or more commands from the plurality of motor driver boards, cause the robotic system to move to a stationary position; and park the robotic system in the stationary position.

17. The robotic system of claim 16, wherein each of the plurality of motors includes a single motor driver board used to control a given motor in response to determining the error condition of the robotic system.

18. The robotic system of claim 16, wherein the plurality of motors control the one or more robotic legs connected to the main body of the robotic system.

19. The robotic system of claim 16, wherein the program instructions are further executable by the one or more processors to cause the robotic system to:

transmit an error message indicating the error condition of the robotic system; and provide visual feedback of the error condition of the robotic system via an indicator on the robotic system.

20. The robotic system of claim 16, wherein the stationary position of the robotic system is determined based on one or more of a current velocity, a current position, and a current acceleration of the robotic system.

* * * * *